June 24, 1930.  D. JOHNSTON  1,767,987
SPRING EQUALIZER
Filed May 31, 1929
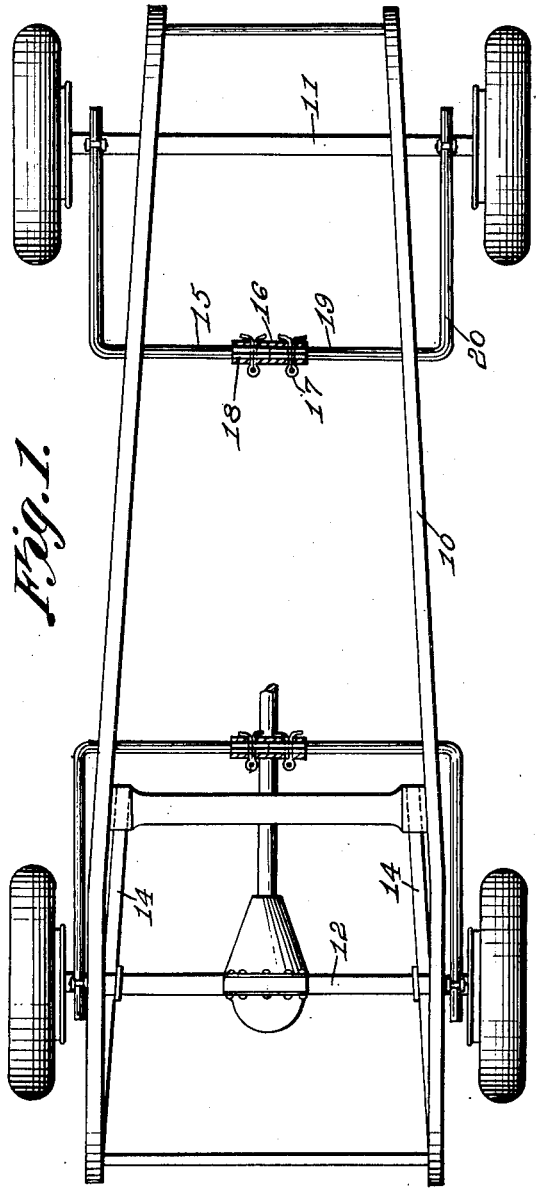
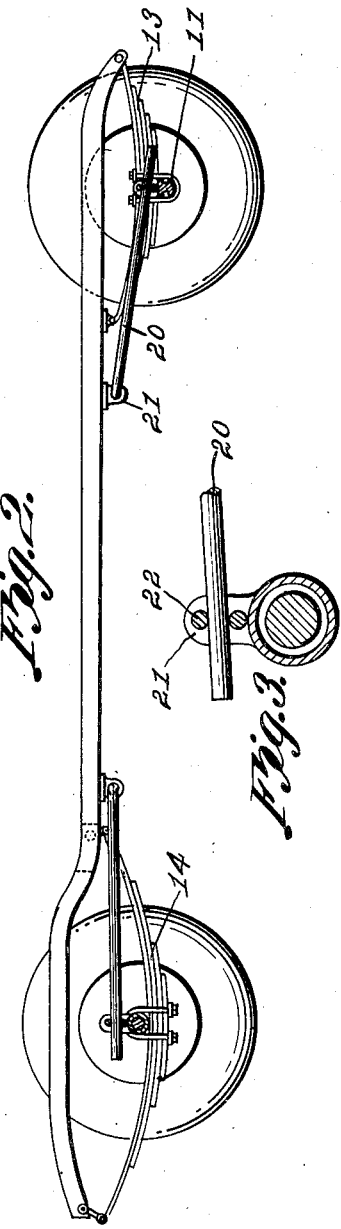
Dick Johnston,
INVENTOR
BY Victor J. Evans
ATTORNEY
WITNESS:

Patented June 24, 1930

1,767,987

UNITED STATES PATENT OFFICE

DICK JOHNSTON, OF BUFFALO, WYOMING

SPRING EQUALIZER

Application filed May 31, 1929. Serial No. 367,596.

This invention relates to spring equalizers for vehicles, an object being to provide means which may be attached to the frame of the vehicle and connected with the axles to distribute the weight of the body of said vehicle to opposite side springs, and thus resist side sway of the body, as well as to absorb shock due to road conditions and other causes.

Another object of the invention is the provision of a spring equalizer of sectional formation, which may be readily applied to or removed from a vehicle.

Another object of the invention is the provision of novel means for effecting a sliding engagement between the equalizer and the vehicle axle.

With the above and other objects in view, the invention further includes the following novel features and details of construction, to be hereinafter more fully described, illustrated in the accompanying drawing and pointed out in the appended claims.

In the drawing:—

Figure 1 is a plan view showing a portion of the chassis of an automobile with the invention applied, parts being shown in section.

Figure 2 is a longitudinal sectional view.

Figure 3 is an enlarged fragmentary sectional view illustrating the connection between the vehicle axle or vehicle axle housing and the side bars of the U-shaped frame.

Referring to the drawing in detail wherein like characters of reference denote corresponding parts, the reference character 10 indicates the side bars of the frame of the vehicle, 11 the front axle and 12 the rear axle housing. The front springs of the vehicle are indicated at 13, while the rear springs are indicated at 14.

The invention which is designed to equalize the action of the springs upon opposite sides of the vehicle body comprises a substantially U-shaped member which is formed of a pair of substantially L-shaped sections 15. These sections are detachably connected by means of a sleeve 16 and cotter pins 17 or analogous fastening devices which serve to connect the adjacent ends of the L-shaped sections 15 and the sleeve 16. The adjacent ends of the L-shaped sections 15 are preferably squared or angular in cross section as indicated at 18.

The construction just described provides a substantially U-shaped member which embodies a cross bar 19 and side bars 20. The cross bar is pivotally connected with the side bars 10 of the vehicle frame as shown at 21 while the side bars extend from this point of pivotal connection to the vehicle axle.

It may be here stated that one of the spring equalizers is used in connection with the front springs 13 and one in connection with the rear springs 14. As the equalizers are of like construction, the description of one will suffice. As shown in Figure 1 of the drawing, the equalizer for the front springs extends forwardly while the equalizer for the rear springs extends rearwardly.

Secured to and rising from the front axle 11 or the rear axle housing 12 as the case may be, are vertically disposed spaced plates 21. These plates are arranged upon opposite sides of the vehicle frame and extend upwardly and are connected by spaced transversely disposed bearing elements 22. These bearing elements are arranged to receive the outer ends of the arms 20 as clearly shown in the drawing, the arms having a sliding pivotal connection with the axle through the construction just described.

It will be apparent from the foregoing description and accompanying drawing that action of one spring will, through the medium of the present invention, be transferred to the opposite spring so that the action of the springs will be equalized and side sway of the vehicle will be prevented. In addition, this action of the equalizer will act to absorb shock due to road conditions so that the invention will also function as a shock absorber.

The invention is susceptible of various changes in its form, proportions and minor details of construction and the right is herein reserved to make such changes as properly fall within the scope of the appended claims.

Having described the invention what is claimed is:—

1. In a spring equalizer for vehicles, a U-shaped frame including a cross bar and side bars extending from the ends of the cross bar, means to pivotally connect the cross bar to the side bars of the frame of the vehicle, means to provide a pivotal sliding connection between the side bars and the axle of the vehicle, said means comprising spaced parallel vertically disposed plates adapted to be carried by the axle of the vehicle, and a pair of spaced horizontally disposed bearing elements connecting the plates and slidingly receiving the side bars between them.

2. In a spring equalizer for vehicles, a frame formed of a pair of substantially L-shaped sections and means connecting the sections to provide a cross bar and side bars extending from the ends of the cross bar, means to pivotally connect the cross bar to the side bars of the frame of the vehicle, and means to provide a pivotal sliding connection between the side bars and the axle of the vehicle.

In testimony whereof I affix my signature.

DICK JOHNSTON.